United States Patent
Okumura

[19]
[11] Patent Number: 5,878,156
[45] Date of Patent: Mar. 2, 1999

[54] DETECTION OF THE OPEN/CLOSED STATE OF EYES BASED ON ANALYSIS OF RELATION BETWEEN EYE AND EYEBROW IMAGES IN INPUT FACE IMAGES

[75] Inventor: Tomoko Okumura, Tokyo, Japan

[73] Assignee: Mitsubishi Denki Kabushiki Kaisha, Tokyo, Japan

[21] Appl. No.: 597,715

[22] Filed: Feb. 12, 1996

[30] Foreign Application Priority Data

Jul. 28, 1995 [JP] Japan .................................. 7-193661

[51] Int. Cl.⁶ ........................................................ G06K 9/00
[52] U.S. Cl. ........................ 382/118; 340/575; 340/576
[58] Field of Search ................................. 382/117, 118, 382/104, 173, 291; 348/78; 351/210; 364/413.02, 424.055; 128/745, 782; 340/575, 576

[56] References Cited

U.S. PATENT DOCUMENTS

| | | | |
|---|---|---|---|
| 4,975,969 | 12/1990 | Tal | 382/116 |
| 5,293,427 | 3/1994 | Veno et al. | 382/1 |
| 5,410,609 | 4/1995 | Kado et al. | 382/118 |
| 5,481,622 | 1/1996 | Gerhardt et al. | 382/103 |
| 5,482,048 | 1/1996 | Johnson | 128/665 |
| 5,573,006 | 11/1996 | Shimotani et al. | 128/745 |

FOREIGN PATENT DOCUMENTS

| | | |
|---|---|---|
| 4441 332 A1 | 11/1994 | Germany . |
| 195 09 689 A1 | 3/1995 | Germany . |
| 196 03 287 A1 | 1/1996 | Germany . |
| 6227278 | 8/1994 | Japan . |

OTHER PUBLICATIONS

Hiroshi Veno et al., *Development of Drowsiness Detection System*, IEEE Publication, Jul. 1994, pp. 15–20.

*Primary Examiner*—Leo H. Boudreau
*Assistant Examiner*—Brian P. Werner
*Attorney, Agent, or Firm*—Sughrue, Mion, Zinn, Macpeak & Seas, PLLC

[57] ABSTRACT

A face image processing apparatus for use in a sleep-inhibition security system for car drivers is disclosed. The apparatus includes an input section for acquiring an input face image of a target person, an eye extraction region setter for determining an eye extraction region within the input face image, and an extractor for extracting from the eye extraction region first and second image components corresponding to an eyebrow image and an eye image respectively. A first detector is adapted to detect relative positions of the first and second image components extracted. A second detector is provided for detecting the open or closed state of at least one eye image by analyzing variations in the relative positions detected.

13 Claims, 18 Drawing Sheets

FIG. 17
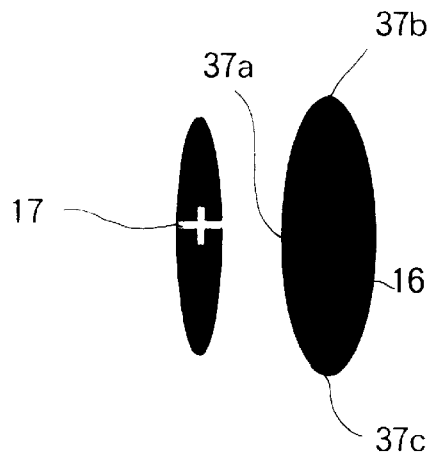
FIG. 18A  FIG. 18B
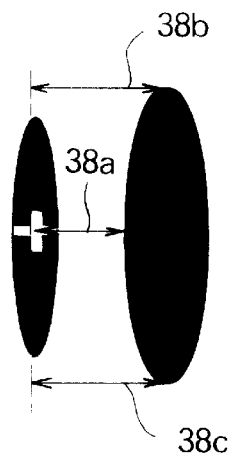 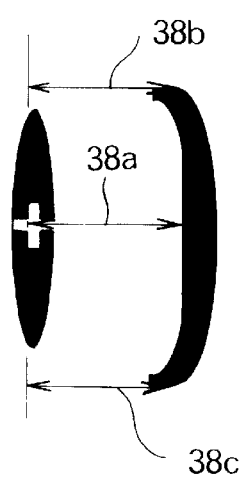
FIG. 19
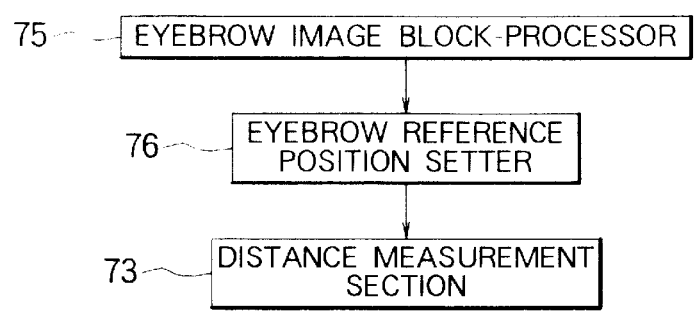

DETECTION OF THE OPEN/CLOSED STATE OF EYES BASED ON ANALYSIS OF RELATION BETWEEN EYE AND EYEBROW IMAGES IN INPUT FACE IMAGES

BACKGROUND OF THE INVENTION

1. Field of the Invention

The present invention relates generally to image pattern recognition, and more particularly to face image processing systems including detection and monitoring of the open or closed state of at least one eye image as extracted using face image processing techniques. The instant invention also relates to a face image processing apparatus for use in security systems for maintaining the continuous of workers safety by raising an alarm upon the occurrence of a doze or sleep while at work.

2. Description of the Prior Art

As one of image pattern recognition techniques, a face image processing system has a wide variety of applications, including an apparatus for detecting falling asleep of a target person, such as an automobile driver, by monitoring the open/closed state of his or her eyes. One of such driver's condition monitoring systems has been described, for example, in Published Unexamined Japanese Patent Application No. 6-227278, which is arranged generally as shown in FIG. 33. The prior art apparatus of FIG. 33 includes an image input section 82 for acquiring an input face image of a driver, a digitizer 83 for digitizing the face image acquired by the image input section 82 to produce a binary face image signal, and an eyeball presence region setter 56 for determining the exact location of an eyeball image region in the binary face image. An eye open/closed state detector 57 is adapted to detect the open or closed state of an eye within the eyeball presence region thus detected. The detector 57 is connected to a driving condition identifier 86 which identifies the actual condition of the driver on the basis of the resulting eye open/close pattern detected by the eye open/close detector 57. A detection error identifier 84 is provided for determining the occurrence of any error in detection of the eyeball presence region based on the detection results of the open/close detector 57. A resetter 85 is also provided for modifying or updating the eye presence region in response to the detection error identification results.

The operation of the prior art apparatus will be described with reference to FIGS. 33 through 36. When a face image of a target driver is acquired and inputted by the image input section 82, the resultant face image is then supplied to the digitizer 83, which digitizes it to produce a binary face image signal. This image signal is given to the eyeball presence region setter 56, which extracts an eyeball image portion from the face image to determine and set the location of such eyeball, i.e., the eyeball presence region therein. The open or closed state detection of the open/close detector 57 is effected within a window 58 (see FIG. 34) taken out of the face image so as to contain the eyeball image portion as set by the eyeball presence region setter 56. The open/close detector 57 may employ one of two different kinds of schemes as the open/closed state detecting method thereof as will be described below.

With a first eye open/closed state detection scheme, an iris is detected in the face image window 58 of FIG. 34 representing the eyeball presence region. As shown in FIG. 35, such iris may be detected by (i) defining a certain circle 59 defined with a given point (x, y) being as a center within the window 58 and four slit-like rectangular marks 60 that extend from the center point (x, y) in four radial directions, (ii) calculating any possible difference in the total sum of brightness values of respective white portions of the rectangular marks 60 and that of hatched portions thereof, and (iii) determining as the iris center a point that exhibits a maximal brightness difference.

The eye-open/closed state detection is effected based on detection of such maximal brightness difference at the iris center thus determined. At this time, if any maximal brightness difference is not detected for a predetermined time period, the detection error identifier 84 then determines that the eye detection fails and a detection error is occurred. Once such eye detection error takes place, the resetter 85 forces the eyeball presence region setter 56 to perform resetting of the eyeball presence region.

A second eye open/closed state detection scheme is as follows. As shown in FIG. 36, the eye window 58 is vertically scanned to search for any contiguous black colored picture elements (pixels) in order to detect an eyeball image, thereby to find out a specific image portion consisting of a maximum number 63 of contiguous black pixels. Calculating this maximum contiguous black-pixel number 63 is done repeatedly with respect to a plurality of images; the resultant maximum and minimum values of them are used to set a suitable threshold value. After the threshold value is set, the open/closed state of eye(s) may be detected by comparing the maximum contiguous black-pixel number 63 to the threshold value. At this time, the detection error identifier 84 may detect that the maximum contiguous black-pixel number 63 remains unchanged during a predetermined time period; if this is the case, it is concluded that no correct eye detection is made. Responding to the determination of such eyeball detection error, the resetter 85 then causes the eyeball presence region setter 56 to perform an eyeball presence region resetting operation, i.e., repeating a similar eyeball presence region setting operation with respect to a different face image region.

As is seen from the above explanation, the prior art apparatus is so arranged as to acquire necessary information used to determine whether a driver is falling asleep or not by analyzing variations of an iris portion which is detected from an eye window taken from a binary face image. Alternatively, the prior art apparatus is arranged to (i) detect a possible eyeball presence region, from which the information as to whether a driver is dozing is obtainable, by vertically scanning the eye window 58 to search for a series of contiguous black pixels therein, (ii) calculate the maximum contiguous black-pixel number, and (iii) finally determine whether the eyeball detection is successful or not by analyzing monitored variations in the maximum contiguous black-pixel number during a predetermined time period.

A drawback of the prior art is that the eyeball detection is unstable and less reliable for the following reasons. A driver's face image sensed may involve shadows due to variations in image pickup light rays incident on his or her face and/or variations in driver's face direction at the time of image pickup. If this is the case, the binary eyeball presence region extracted from a digitized face image may become unstable, causing an intended eyeball image to shift in position from a regular location or letting an eyeball image be deformed into an ellipsoidal shape. As far as detection of the open/closed state of an eye is performed by detecting an iris image under such an unstable condition, the prior art apparatus is incapable of suppressing or eliminating the occurrence of detection errors.

Another drawback of the prior art is that an erroneous threshold value may possibly be set depending upon the actual binary state of an input face image, causing eye-open/close detection to fail due to the fact that the prior art apparatus focuses attention only to an eye portion of the eyeball presence region in the input face image and determines a threshold value with such eye portion being as a reference.

SUMMARY OF THE INVENTION

It is therefore an object of the present invention to provide a new and improved face image processing scheme.

It is another object of the invention to provide a new and improved face image processing apparatus which can detect the open or closed state of an eye at higher precision.

It is a further object of the invention to provide a new and improved face image processing apparatus which can precisely detect the open/closed state of a driver's eye by employing specific information as to variations in relative positions of an eye image and of an eyebrow image which remains unchanged in state within an input face image sensed.

In accordance with the above objects, the instant invention is drawn to a specific face image processing system which detects the open or closed state of at least one eye of a target person being monitored, by analyzing positional relation between an eye image and its associated eyebrow image in an input face image, rather than the state of a mere iris image.

According to one aspect of this invention, a face image processing apparatus includes input section for acquiring an input face image of a target person, an eye extraction region setter for determining an eye extraction region within the input face image, an extractor for extracting from the eye extraction region first and second image components corresponding to an eyebrow image and an eye image respectively, a first detector for detecting relative positions of the first and second image components extracted, and a second detector for detecting a closing degree of the eye image by analyzing variations in the detected relative positions.

According to another aspect of the invention, a face image processing apparatus includes a face image input section for acquiring an input face image of a face being monitored, an eye extraction region setter for setting an eye extraction region within the input face image, a face image characteristic extractor for extracting an eyebrow image and an eye image from the eye extraction region, an area detector for detecting an area of the eyebrow image and an area of the eye image, an area ratio calculator for calculating an area ratio between the eyebrow image and the eye image, and a closing degree detector for detecting a degree of an open or closed state of an eye by analyzing variations in the area ratio between the eyebrow image and the eye image calculated by the area ratio calculator.

According to a further aspect of the invention, a face image processing apparatus includes a face image input section for acquiring an input face image of a face being monitored, an eye extraction region setter for setting an eye extraction region within the input face image, a face image characteristic extractor for extracting an eyebrow image and an eye image from the eye extraction region, a width measurement section for measuring a width of a certain portions of each of the eyebrow and eye images along a length of the face, a width-ratio calculator for calculating a width ratio between the width of the eyebrow image and that of the eye image, and a detector for detecting an open or closed state of an eye based on variations in the width ratio calculated by the width-ratio calculator.

These and other objects, features and advantages of the invention will be apparent from the following more particular description of preferred embodiments of the invention, as illustrated in the accompanying drawings.

BRIEF DESCRIPTION OF THE DRAWINGS

FIG. 17 illustrates a model including spaced-apart eyebrow and eye image components to be processed by a relative position detector of the third embodiment of FIG. 16.

FIGS. 18A and 18B show respective combinations of image patterns to be processed by an eye-open/close detector of the third embodiment of FIG. 16.

FIG. 19 is a schematic block diagram of a relative position detector in accordance with a fourth embodiment of the invention.

DETAILED DESCRIPTION OF THE INVENTION

Figure 1:
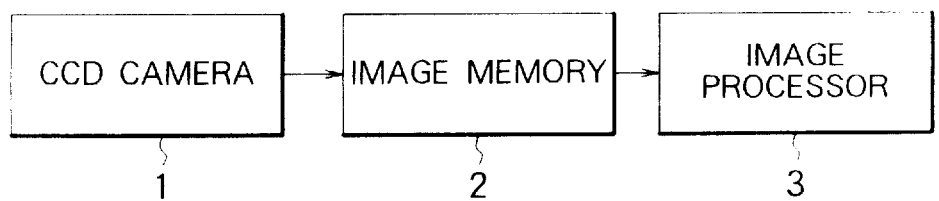
FIG. 1 is a schematic block diagram of a face image processing system embodying the present invention.

Referring to FIG. 1, there is shown a face image processing system embodying the invention, which may be preferably used for presently available car security systems that monitor the open or closed state of eyes of a target person, such as an automobile driver, and establish safety driving by transmitting an alarm upon the occurrence of a dozing or half-sleeping while driving. The face image processor includes a charge-coupled device (CCD) monitor camera 1 for sensing or "photographing" the face of the driver to produce a face image data signal. An image memory 2 is connected to the CCD camera 1 for storing the face image data derived from the CCD camera 1. An image processing unit 3 is connected to the image memory 2 for performing image processing operations based on the data stored in the image memory 2.

Figure 2:
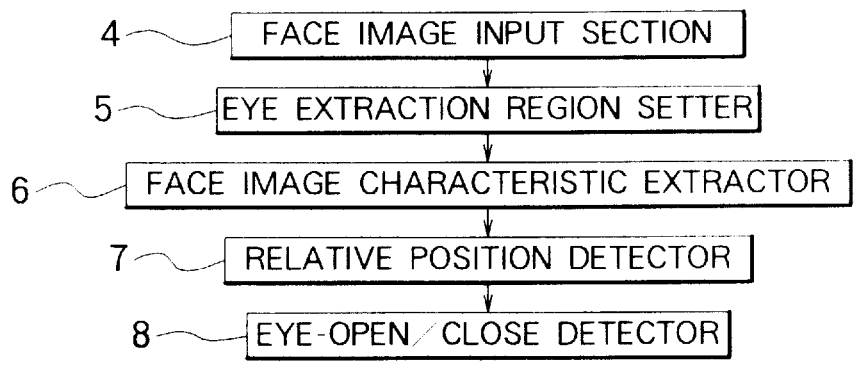
FIG. 2 is a block diagram of an image processing section of the embodiment of FIG. 1.
Figure 3:
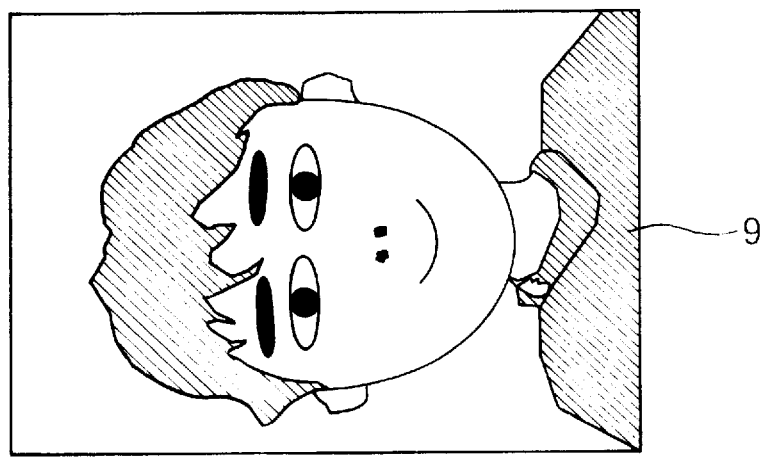
FIG. 3 exemplarily shows a face image sensed by a charge-coupled device (CCD) monitor camera shown in FIG. 1.
Figure 4:
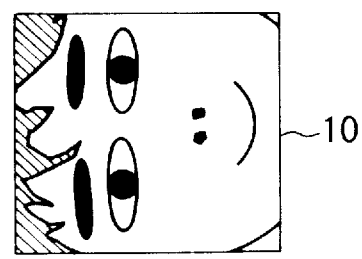
FIG. 4 shows a face region template taken out of the face image of FIG. 3 by an eye-extraction region setter shown in FIG. 2.
Figure 5:
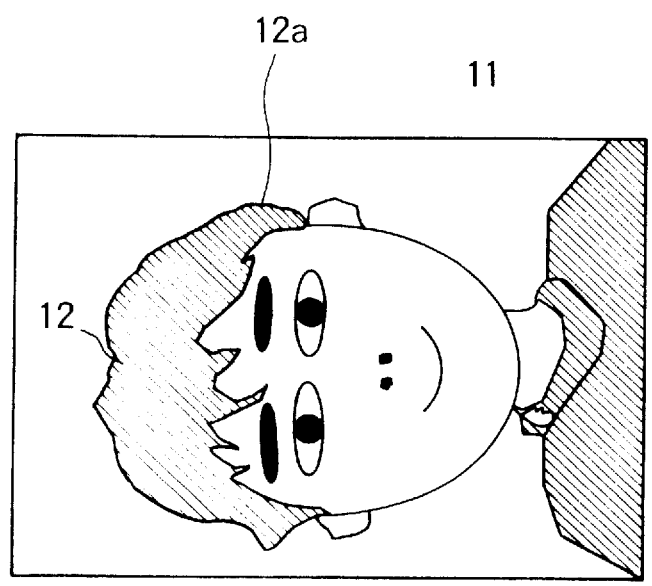
FIG. 5 shows a pair of eye extraction regions extracted from the input face image and representing right and left eyes of a target driver being monitored.

The arrangement of the face image processor 3 of FIG. 1 is shown in FIG. 2. The image processor 3 includes a face image input section 4. The image data representing the driver's face as sensed by the CCD camera 1 and then stored in the image memory 2 (the image data will be referred to as the "face image" hereinafter) is sent by the face image input section 4 to an eye extraction region setting section 5. The eye extraction region setter 5 determines a suitable part of the input face image as an eye extraction region, which will be used to extract an eye image component from here. A face image characteristic extracting section 6 is connected to an output of the eye extraction region setter 5, for extracting from the eye extraction region specific kinds of characteristic image components which represent an eyebrow and an eye of the target driver being monitored, respectively. The extractor 6 is connected at its output to a relative position detecting section 7, which functions to detect relative positions of the eyebrow and eye images thus extracted. The detection results are then supplied to a final-stage detector section 8, which acts to detect the actual degree of closure of at least one eye of the driver by analyzing variations in the relative positions detected, thereby determining the open or closed state of it; in this respect, the section 8 will be called the "eye-open/close detector" hereinafter. The face image processor in accordance with one preferred embodiment of the invention is specifically arranged to employ a selected template-matching correlation technique to extract from the input face image some extraction subjects including the eye extraction region, the eyebrow image and the eye image in a manner as will be described below.

Figure 6:
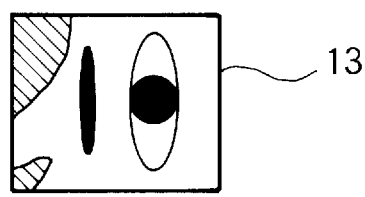
FIG. 6 shows an eye region template prepared by a face image characteristic extracting section of FIG. 2 to extract an eye region from respective eye extraction regions of FIG. 5.
Figure 7:
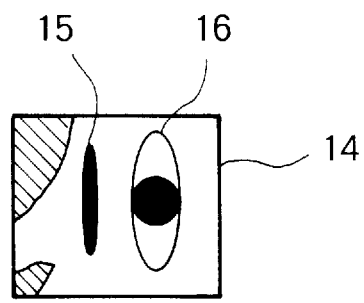
FIG. 7 shows an eyebrow image and eye image extracted by the face image characteristic extractor of FIG. 2 using the eye region template of FIG. 6.

The operation of the face image processor using template-matching techniques will now be described with reference to FIGS. 4 to 7. The face image input section 4 acquires a face image 9 of a target driver as sensed by the CCD camera 1 and stored in the memory of FIG. 1. The eye extraction region setter 5 then determines within the face image 9 a rectangular face-image template 10 shown in FIG. 4, which essentially corresponds to the face image region. Then, the face image characteristic extractor 6 extracts from the face image template 10 a pair of small rectangular image regions 12a, 12b, which essentially correspond to the right and left eyes of the driver, respectively, and from which the eye images are to be extracted. An eye region template 13 shown in FIG. 6 is used to extract an eye region from each of the right- and left-eye extraction regions 12a, 12b, thereby to provide an eyebrow image 15 and an eye image 16 extracted using the eye region template 13 as shown in FIG. 7.

The eye extraction setter 5 performs correlative arithmetic processing for the face region template 10 and the face image 9, while setting in advance the face region template 10 that specifies the face region. During such correlative processing, when a specific position is found whereat the correlative arithmetic processing result S becomes minimum, this position is then taken as the face region 11 of FIG. 5. Note here that the correlative processing result S may be represented by:

$$S = |N-T| \tag{1}$$

where N is the brightness of the face image 9, and T is the brightness of the face region template 10. In the face region 11 thus specified, the upper left portion of it along the length of the driver's face is determined as the left eye extraction region 12a whereas the upper right portion thereof as the right eye extraction region 12b. Similar template-matching process is carried out with respect to these eye extraction regions 12a, 12b, thereby to extract the eyebrow image 15 and eye image 16 shown in FIG. 7.

Regarding extraction of the eyebrow and eye images 15, 16, the face image characteristic extractor 6 of FIG. 2 prepares in advance the eye region template 13 specifying an eye region containing the image of an eye and that of an eyebrow, and then effects suitable correlative arithmetic processing for the eye region template 13 and the eye extraction region 12a in accordance with equation (1) as presented above. If a specific position is found whereat the correlative processing result S is minimum, such position is then selected as an eye region 14. Within this eye region, further correlative processing is performed using the eye region template 13 to determine the presence of an eyebrow and a corresponding eye associated therewith, causing the eyebrow and eye images 15, 16 to be extracted therefrom as shown in FIG. 7.

Figure 8:
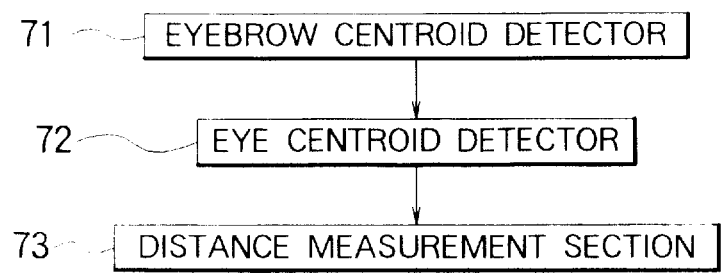
FIG. 8 is a schematic block diagram of a relative position detector of FIG. 2.

Subsequently, the relative position detector 7 detects relative positions of the eyebrow image 15 and the eye image 16 thus extracted. As shown in FIG. 8, the relative position detector 7 includes an eyebrow center detecting unit 71 for computing the coordinates of a center point or "centroid" of the eyebrow image 15 midway between the opposite edges along the width of the face. An eye center detecting unit 72 is connected to the detector 71, for computing the centroid of the eye image 16 midway along the face length. A distance measuring unit 73 is connected to the detector 72 for measuring the actual distance between the eyebrow center and the eye center thus detected.

Figure 9:
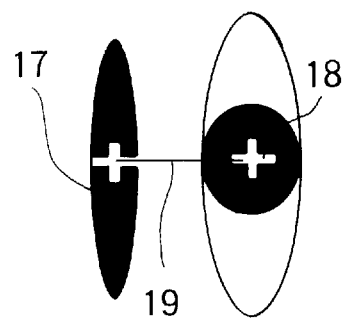
FIG. 9 illustrates a model showing a distance between spaced-apart eyebrow and eye center points as respectively detected by an eyebrow center detector and an eye center detector shown in FIG. 8.

As shown in FIG. 9, the eyebrow center detector 71 and the eye center detector 72 compute the positions of two centers or "centroids" 17, 18 spaced apart along the face length with respect to the eyebrow image 15 and the eye image 16, respectively. Note that a centroid (X, Y) may be obtained using equations (2) and (3) that follow:

$$X = Xt/\text{total}, \quad (2)$$

$$Y = Yt/\text{total}, \quad (3)$$

where, Xt is the total sum of x-coordinate values of all pixels xi of the image, "total" is the whole number of pixels (xi, yj), and Yj is the total sum of y-coordinate values of all pixels yj. Note also that the center value X is employed as the centroid along the face length.

Figure 10A:
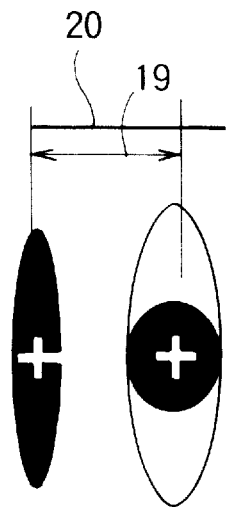
FIGS. 10A and 10B show respective image patterns produced by an eye-open/close detector of FIG. 2.
Figure 10B:
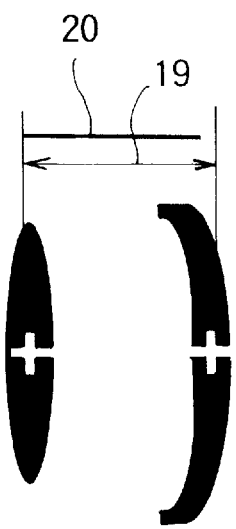

Then, the distance measurement unit 73 measures an actual distance 19 between the centroids 17, 18 in the longitudinal face direction. The eye-open/close detector 8 of FIG. 2 detects the eye's closing state based on the measured distance between the centroids 17, 18 to produce a detection signal indicative of how much degree the eye is closed, which in turn means whether or not the target driver is dozing while driving. More specifically, when the driver's eye is open as shown in FIG. 10A due to the fact that s/he does not feel sleepy, the resulting distance between the centroids 17, 18 is less than a predetermined threshold value 20; in contrast, if the driver's eye is closed due to the occurrence of a doze, the resultant distance between centroids 17, 18 becomes greater than the threshold value 20.

Accordingly, it is possible for the eye-open/close detector 8 to accurately detect the actual open or closed state of the driver's eyes by comparing the measured distance 20 between the centroids 17, 18 with a reference distance of the threshold value 20. With the embodiment, the eyebrow-image centroid and the eye-image centroid are specifically employed as the reference points for detection of variations in the positional relation between the eyebrow and eye images. This can speed up the eye open/close detecting operations while rendering algorithms required therefor much simplified.

Figure 11:
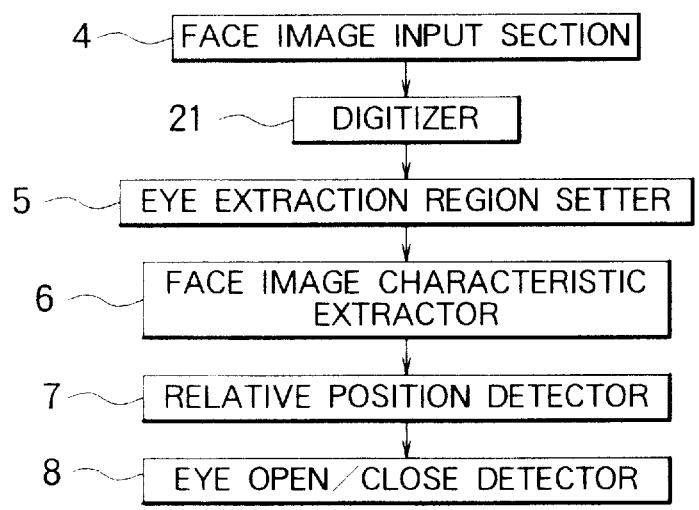
FIG. 11 is a schematic block diagram of a face image processing apparatus in accordance with a second embodiment of the instant invention.

A face image processor of FIG. 11 in accordance with a second embodiment of the invention is similar to that of FIG. 2 with the eye extraction region setter of FIG. 2 being replaced by a digitizer section 21. While the first embodiment detects the degree of eye's closure using the eyebrow and eye images extracted by template-matching techniques from an input face image, the second embodiment is specifically arranged so that eyebrow and eye images of binary data form are extracted from a face image digitized using a filtering process and are used to attain the detection of eye's closing degree.

As shown in FIG. 11, the digitizer 21 is connected between the face image input section 4 and the eye-extraction region setter 5. An input face image acquired by the face image input section 4 is sent to the digitizer 21, which performs filtering operations in a manner as will be described in detail below, thereby producing an output binary face image data signal. The binary face image is then subjected at the eye extraction region setter 5 to an eye extraction region defining process, thereby to determine an eye extraction region extracted from the binary face image. The resulting eye extraction region is supplied to the face image characteristic extractor 6, which extracts therefrom an eyebrow image and an eye image. These images are then supplied to the relative position detector 7, which detects the relative positions of the extracted eyebrow and eye images for analysis of positional relation therebetween. In response to receipt of the detection results, the eye-open/close detector 8 detects eye's open/closed state by analyzing variations in the positional relation between the eyebrow and eye images.

Figures 12A, 12B, 12C, 12D:
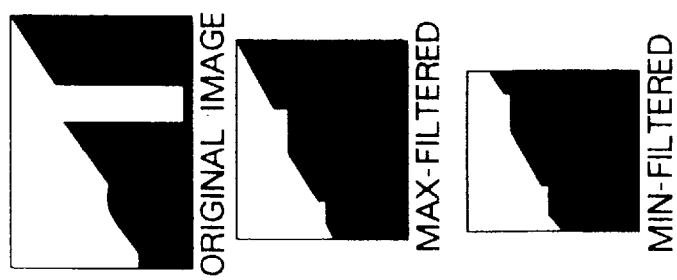
FIG. 12 illustrates several characteristics of a MAX/MIN filter used in a digitizer of FIG. 11.
Figure 13:
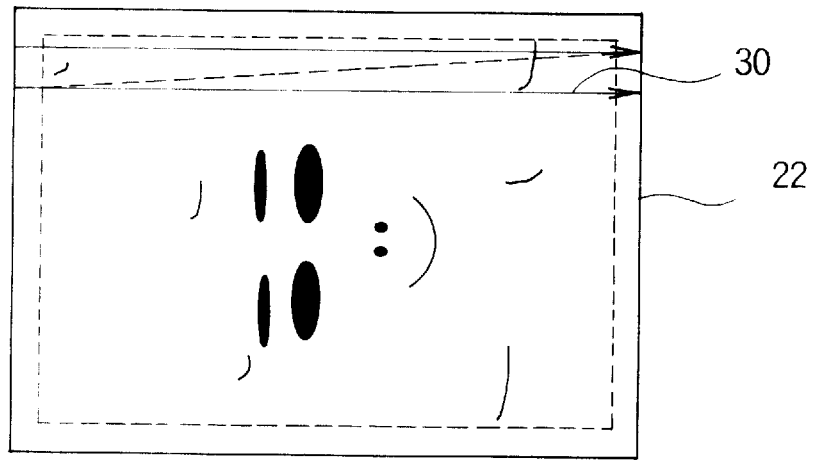
FIG. 13 schematically shows a pattern of a binary face image obtained by a digitizing processing at a digitizer shown in FIG. 11.

The second embodiment operates as follows. Several characteristics of MAX/MIN filter circuits for use in the digitizer 21 of FIG. 11 are shown in FIG. 12 as designated by parts (a) to (d) respectively. The digitizer 21 receives and digitizes an input face image from the face image input section 4 to produce a corresponding binary data signal indicative of the face image 22 as shown in FIG. 13.

Upon receipt of an image signal 24 representing a part of the input face image, the digitizer 21 performs a MAX-filtering operation for it to produce a MAX-filtered image signal 25, and then effects MIN-filtering with respect to the MAX-filtered image signal 25 thus producing a MIN-filtered image signal 26, both of the signals 25, 26 being shown at part (a) of FIG. 12. FIG. 12 also shows at part (b) an array of pixels 27–29 corresponding to formatted pixels as obtained by formatting brightness values of the image signals 24–26. Note here that one square frame surrounding one brightness value represents a single pixel, and that the brightness values are assumed to range from zero (0) to twenty (20) for purposes of simplicity only.

First, the input face image is MAX-filtered by a MAX-filter, which has a fixed length (to be referred to as the "filter size" hereinafter) when the pixel number is a, and converts the brightness value of a center pixel of the image into the maximum brightness value. Assume that the pixel number a is five (5). When a pixel array 27 is MAX-filtered at its hatched portions shown at part (b) of FIG. 12, the brightness value of a pixel 27a located in the center of such filter space is then converted from eight (8) to ten (10) due to the fact that the maximum brightness value is 10.

A similar MAX-filtering operation is repeated while causing the input image to sequentially shift in position to the right with one pixel being as a unit. This allows the pixel array 27 shown at part (b) of FIG. 12 to be converted into a pixel array 28. After completion of the MAX-filtering, MIN-filtering is then carried out for the resulting MAX-filtered image. The MIN-filter is identical in filter size with the MAX filter, and converts the brightness of a filter-center pixel into the minimum brightness value as found within the filter space.

By effecting such MIN-filtering with respect to the hatched portions of pixel array 28 shown at part (b) of FIG. 12 after completion of the MAX-filtering, the brightness value of a pixel 28b located in the center of the filter space is converted from twelve (12) into ten (10) due to the fact that the minimum brightness value in this case is 10.

The MIN-filtering is repeated while causing the input image to sequentially shift in position to the right at an interval equivalent to one pixel size, with the result of the pixel array 28 being converted into an updated pixel array 29 as illustrated at part (b) of FIG. 12. The resultant MIN/MAX-filtered image is then processed so that the input image is subtracted from it, thus extracting a low-brightness region that is less in width than the filter size. More specifically, with the example illustrated, the brightness value of the pixel array 27 is subtracted from that of the pixel array 29 shown at part (b) in FIG. 12 to provide a new pixel array shown at part (d) of FIG. 12, which is then converted into an electrical image signal as shown at part (d) of FIG. 12.

During the above filtering operations, both the MAX-filter and the MIN-filter are arranged to start their conversions from the center of an initially filtered image and to terminate the same at the center of a finally filtered images. This causes the MAX-filtered image data to correspond to an array of pixels 28c–28d, and the MIN-filtered image data to those 29e–29f shown at part (b) in FIG. 12. As a consequence, the image finally obtained through the MAX/MIN-filtering operations becomes smaller in size than the filtering start position and the filtering termination position by a length equivalent to "a−1" pixels respectively.

Figure 14A:
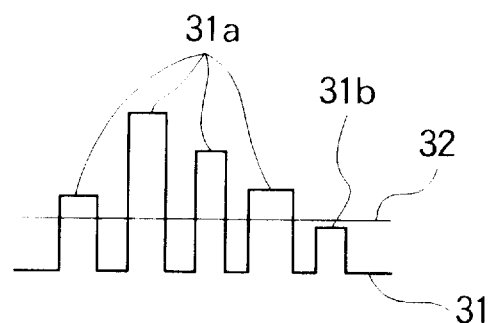
FIGS. 14A and 14B show waveforms of major signals generated during operations of the digitizer.

The digitizer 21 of FIG. 11 operates as follows. With the embodiment, the filtering is sequentially effected with respect to each of a plurality of parallel scanning lines 30 along the face length as shown in FIG. 13. As a result, as shown in FIG. 14A, an image signal 31 is obtained after completion of MAX/MIN-filtering operations to the input face image with the filter lengths corresponding to the widths of eyebrows and eyes. In this case, some additional image components are also extracted which represent a nose and mouth lips less in width than the eyebrow and eyes. It can be seen from viewing the pulse pattern of FIG. 14A that, since the characteristic points 31a of the eyebrow and eye images are greater in brightness difference than the others around them, their brightness values are increased after being put into the subtraction processing.

Figure 14B:

In contrast, shadows or images of clothes of a target driver being monitored remain less in brightness difference than the others as seen from a pulse component 31b in FIG. 14A. By taking account of this, a threshold level 32 is set at a fixed threshold value as shown in FIG. 14A, allowing the pulse components 31a, 31b of the image signal 31 to be binarized using the threshold level 32 in such a manner that those (31a) of the pulses which are greater or "higher" in potential than the threshold level 32 are converted into corresponding pulses of fixed height, and that the other(s) 31b smaller or "lower" and the threshold level 32 are neglected, providing a binary pulse signal shown in FIG. 14B. The filtered face image is shown in FIG. 13. Note that black-painted regions in this and following figures of drawing that will be introduced by reference hereinafter are intended to designate binary image portions or components being greater in brightness difference than the threshold level 32. In other words, black regions are of logic "1" or "High" whereas white background is logic "0" or "Low."

After the digitizing processing is completed, an eye extraction region is then extracted by the eye extraction setter 5 of FIG. 11 in a manner described as follows. First, the eye extraction setter 5 calculates the position of a reference point 33 (see FIG. 15A) for the entire region of the resultant binary image 22 of FIG. 13. The reference point 33 is a specific one that may typify all the black-painted, binary image portions; in this sense, the reference point 33 may alternatively be called the "centroid." The centroid 33 may be found by executing some calculations similar to those following equations (2) and (3) as presented earlier in this description, except that "xi" and "yj" in this case are used to specify black-painted image regions in the binary image 22.

Figure 15A:
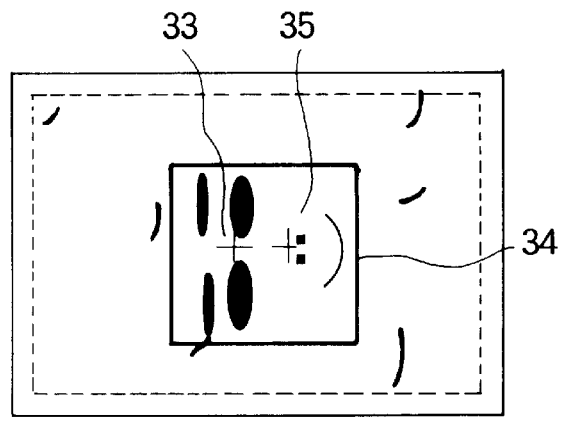
FIGS. 15A and 15B show image patterns as generated during operations of an eye extraction region setter of FIG. 11.
Figure 15B:
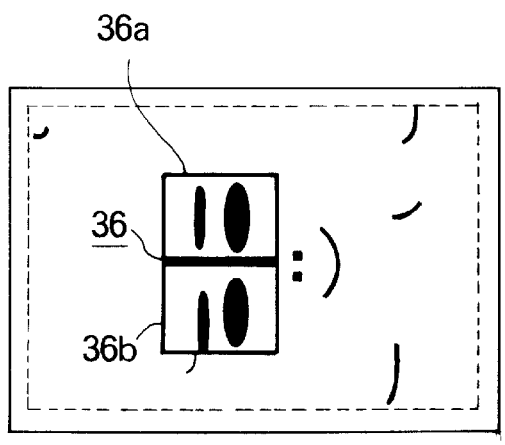

After the calculation of centroid 33 is completed, a partial region 34 is then specified based on the centroid 33. This region 34 may possibly contain a face image; in this regard, it will be referred to as the "face region" hereinafter. The face region 34 is defined to have a rectangular frame that includes some or all of the characteristics of a face (at least eyes). This is done by taking account of the fact that the face region 34 may at least partially contain the main section of the input face image at increased possibility, and that the centroid of a human face is usually between the nose and eyes in the center of the face. A centroid 35 with respect to the face region 34 may be found by calculations similar to those using equations (2) and (3) presented above. The centroid 35 is used for determination of an eye extraction region as will be described below with reference to FIG. 15B. Assume that the centroid 35 of face region 34 is in the vicinity of the nose. The face region 34 is divided into halves with the centroid 35 being as a division center, one of which halves (i.e., the left-hand part of the 90°-turned face illustration of FIG. 15A) may most possibly contain eye images, and the other of which halves (i.e., the right-hand part of the FIG. 15A illustration) may contain the nose and mouth images. The left-handed half region is determined as an eye extraction region 36 as shown in FIG. 15B. This region 36 is then subdivided by a line passing through the both centroids 33, 35 into a pair of neighboring sections 36a, 36b: one section 36b acts as an eye extraction region for the right eye, whereas the other 36a as an eye extraction region for the left eye.

The face image characteristic extractor 6 of FIG. 11 extracts several characteristics from the binary face image by (i) recognizing one of two black regions which is at the upper side along the face length within each of the eye extraction regions 36a, 36b as an eyebrow image 15, and (ii) interpreting the other of them at the lower side as an eye image 16. The subsequent operations of the relative position detector 7 and of the eye-open/close detector 8—i.e., finding "centroid" points for the eyebrow and eye images, and defining the eye closing degree based on variations in distance between them—are similar to those in the first embodiment.

With the second embodiment, similar advantages to those of the first embodiment may also be obtained regarding high-speed eye-open/close detection with simplified procedure. In addition, the second embodiment can offer enhanced accuracy of detection due to the fact that eye-open/close detection is effected by the use of precise analysis on the actual variations in shape of binary eye images with no gray-scale portions.

A common feature of the first and second embodiments is that the relative position detector is adapted to detect a distance between the centers or "centroids" of the eyebrow and eye images, and that the eye open/close detector is provided to decide the open or closed state of driver's eyes. The operation of this detector is as follows: when the detected distance is greater than the threshold level of a fixed value, the eye-open/close detector then determines that the eyes are at least partially closed; when the detected distance is less than the threshold level, the detector determines that the eyes are open.

Figure 16:
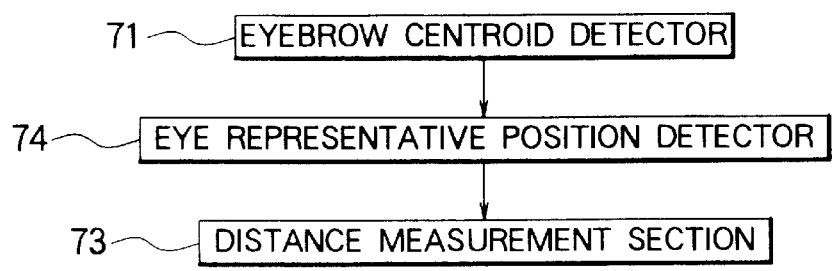
FIG. 16 is a schematic block diagram of a face image processing apparatus in accordance with a third embodiment of the invention.

A face image processor in accordance with a third embodiment of the invention is shown in FIG. 16. This processor includes an eyebrow center detecting section 71 for detecting a center or "centroid" 17 of an eyebrow image 15, an eye representative position detecting section 74 for detecting the maximum value at the upper center of an eye image 16 along the length of a human face and for specifying the position of at least one representative point (eye's representative position) along the face length, and a distance measurement section 73 for measuring the actual distance between the eyebrow center and the eye's representative position.

The third embodiment operates as follows. Since the operation of the eye centroid detector 71 is similar to that of the first embodiment, the repetitive explanation therefor will be omitted for purposes of simplicity. The following description begins with the operation of the eye representative position detector 74.

As shown in FIG. 17, this detector 74 detects (i) a maximum value 37$a$ at the upper center position of the eye image 16 as extracted by the face image characteristic extractor 6 and (ii) a pair of eye's representative positions 37$b$, 37$c$ of the eye image 16 which correspond to two opposite edges (both side edges) of an eye spaced part along the width of a human face. Specifying these characteristic points 37$a$–37$c$ may be done by the following procedure. First, count the number of a series of contiguous black pixels in an eye image to provide a corresponding histogram. Then, find a peak value in the histogram to recognize such peak value as a maximum value at this time. Next, search for minimum values appearing on the right and left sides of the peak value in the histogram to take them as the eye's representative positions 37$a$, 37$b$. During such operation, necessary coordinate values are also calculated including the eyebrow centroid, the maximum value 37$a$, and the eye's representative positions 37$b$, 37$c$. If the driver's eyes are closed for a doze, the coordinate value of the maximum 37$a$ is to be midway or in almost the center between the coordinate values of the eye's representative positions 37$b$, 37$c$.

Once after respective positions are detected, the distance measurement section 73 then detects (i) a distance 38$a$ between the eyebrow centroid 17 and the maximum value 37$a$, and (ii) distances 38$b$, 38$c$ between the centroid 17 and respective eye's representative positions 37$b$, 37$c$ by analyzing respective coordinate values thus obtained, as shown in FIGS. 18A and 18B. Subsequently, the eye-open/close detector 8 detects the actual closing degree of eyes based on variations in the distance values 38$a$–38$c$ thus detected in a similar manner to that of the previous embodiments. As shown in FIG. 18A, if the driver's eyes are open, the resulting "intermediate" distance 38$a$ is shorter than the remaining "edge" distances 38$b$, 38$c$ with an increased difference being observed therebetween. On the other hand, if the eyes are closed as shown in FIG. 18B, the intermediate distance 38$a$ does no longer exhibit any significant difference as compared to the edge distances 38$b$, 38$c$.

With the third embodiment, it is possible to speed up the detection processing due to the execution of eye open/close detection using the binary image data. Moreover, the eye open/close detection can also be much enhanced in precision due to the fact that such detection is done based on the actually measured variations in the eye's shape.

A face image processor in accordance with a fourth embodiment of the invention includes a relative position detector shown in FIG. 19. While the first to third embodiments utilize the complete extracted eyebrow and eye images as objects for eye-open/closed state detection, the fourth embodiment is so arranged as to (i) extract the eyebrow image, which does not change due to the open/close movement of an eye, from a binary face image using a block frame of a fixed area and, then, (ii) detect the open/closed state of the eye by analyzing variations in the distance between such block-processed eyebrow image and the eye image. As shown in FIG. 19, the relative position detector includes an eyebrow image block-processing section 75 for converting an eyebrow image 15 into a set of block portions, an eyebrow reference position setting section 76 for determining a reference position of the eyebrow blocks along the length of a human face, and a distance measurement section 73 similar to that of the previous embodiment.

The operation of the embodiment will be described with reference to FIGS. 20A–20B, 21A–21B and 22. The block-conversion processing is effected either for some selected black pixels within a predetermined region of a binary face image or for certain pixels having threshold values greater than a predetermined value within a certain region of a non-binary image. The description will continue with respect to the former, since the latter may be accomplished similarly.

Figure 20A:
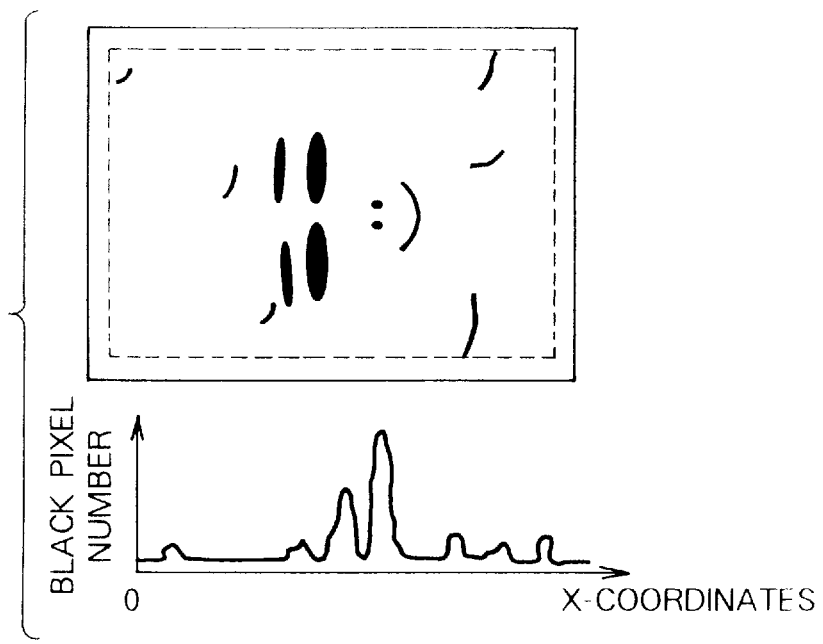
FIGS. 20A and 20B show transverse face histogram profiles as generated by an eyebrow image block-processing section of FIG. 19.
Figure 20B:
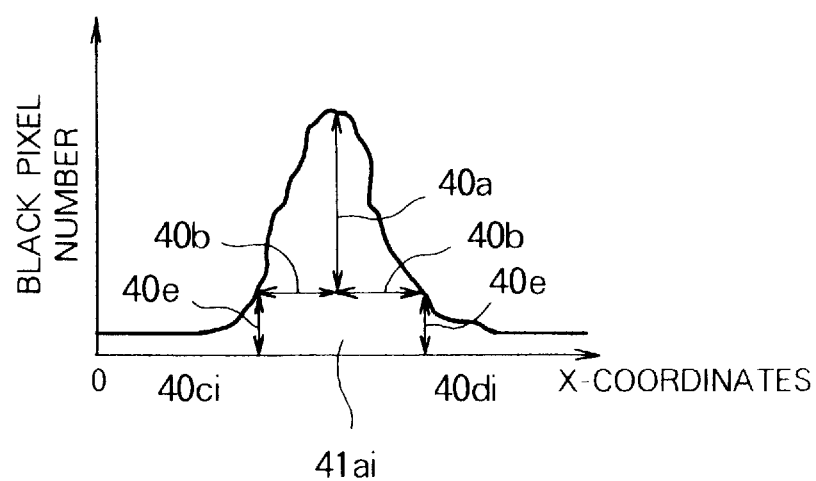

First, count the number of an array of black pixels along the width of a human face within the predetermined region of the binary face image. The black pixel number count is executed with respect to the x coordinate direction. The resulting x-coordinate count value is used to provide a face-transverse direction histogram shown in FIG. 20A, wherein the vertical axis indicates the black pixel number and the horizontal axis represents the x coordinate values. Then, as shown in FIG. 20B, search for any peaks whereat extreme points of the black pixel number become larger than a value 40$a$ in the histogram. For each peak, set or assign a start position 40$ci$ and an end position 40$di$, each of which exhibits a black pixel number greater than a value 40$e$ and a distance less than a value 40$b$ to define a limited range along the x-coordinate axis. In other words, each peak of the black-pixel number distribution profile of FIG. 20B is "cut away" by a line parallel with the x-coordinate axis and connecting two specific points of the black pixel number equal to the value 40$e$, which points correspond to the start and end points 40$ci$, 40$di$ respectively.

Figure 21A:
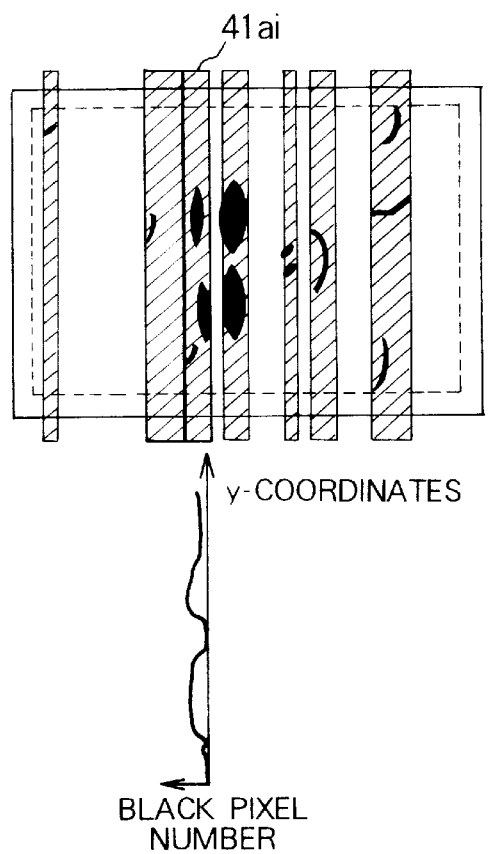
FIGS. 21A and 21B show longitudinal face histogram patterns generated by the eyebrow image block-processing section.
Figure 21B:
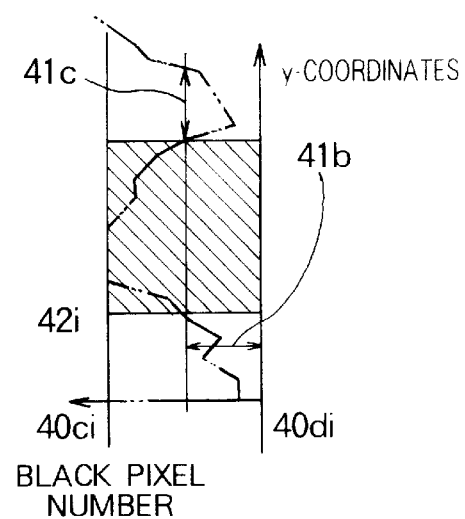
Figure 22:
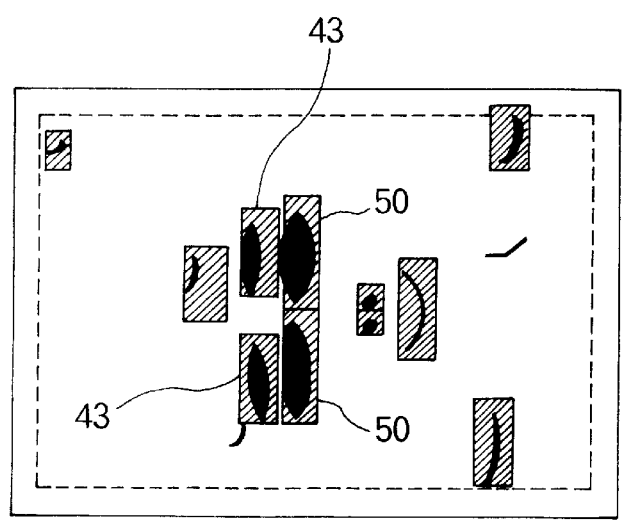
FIG. 22 shows an image pattern being block-processed by the eyebrow image block-processor.

Next, as shown in FIG. 21, define several strip-like regions 41$ai$, which correspond to respective peaks and each of which has a specific width as defined by the start and end positions 40$ci$, 40$di$. For each strip 40$ai$, count the number of black pixels aligned in the direction of the y-coordinate axis, thus providing a face-longitudinal direction histogram shown in FIG. 21A. Thereafter, extract from each strip at least one portion which is spaced apart from its adjacent block at a distance greater than a value 41$c$ and contains black pixels greater in number than a value 41$b$. Each portion extracted is used as a unit block 42$i$. Finally, the eyebrow block-processor 75 defines in the binary face image a pair of eye image blocks 43 shown in FIG. 22 by repeating the y-direction block-conversion procedure effected for the eyebrow image 15. At this time, the maximum value 37$a$ and eye representative positions 37b, 37c of an eye image are also obtained in substantially the same manner as in the previous embodiments, except that the coordinates of them are determined with the maximum-value position of the eyebrow blocks 43 being as a reference position.

Figure 23:
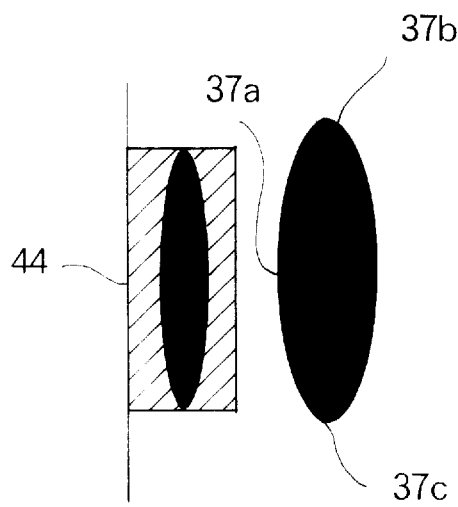
FIG. 23 illustrates a model of spaced-apart eyebrow and eye image components to be processed by a relative position detector of the fourth embodiment.

As shown in FIG. 23, the eyebrow reference position setter 76 of FIG. 19 takes the maximum-value position of the eyebrow blocks 43 along the face length as a reference position 44. The distance measurement section 73 then performs necessary measurements based on respective values 45a, 45b, 45c respectively representing distances from the eye representative positions 37a, 37b, 37c detected by the eye representative position detector 74.

Figure 24A:
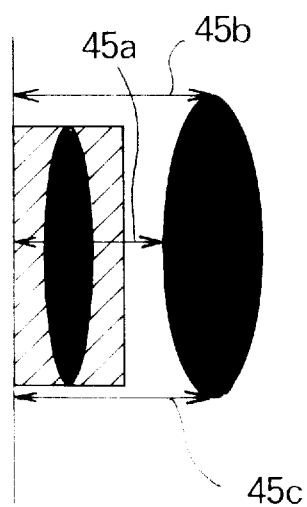
FIGS. 24A and 24B show respective combinations of image patterns to be processed by an eye-open/close detector of the fourth embodiment.
Figure 24B:
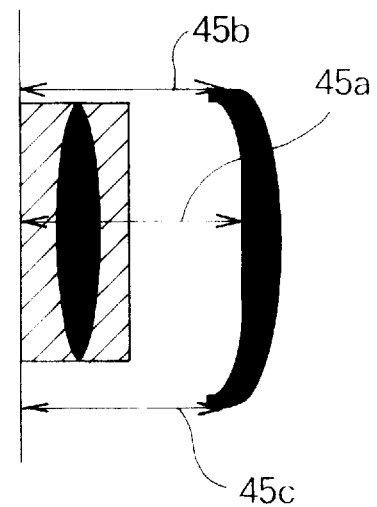

The eye open/close detector 8 is also employed in this embodiment, which detects the open or closed state of eyes on the basis of the relationship among the distances 45a–45c in this case. As is apparent from viewing FIGS. 24A and 24B, when a target person opens his or her eyes, the distance 45a exhibits an extreme difference from the remaining distances 45b, 45c in a corresponding block-converted image; but, in contrast, when s/he closes eyes, the resulting distance 45a remains slightly different from the remaining ones 45b, 45c—i.e., there is no extreme difference between the distance 45a and the others 45b, 45c. Accordingly, with this embodiment, it becomes possible to effect detection of the open or closed states of eyes at higher precision even when the eyebrow images vary in shape with possible variations in face image pickup conditions.

Figure 25:
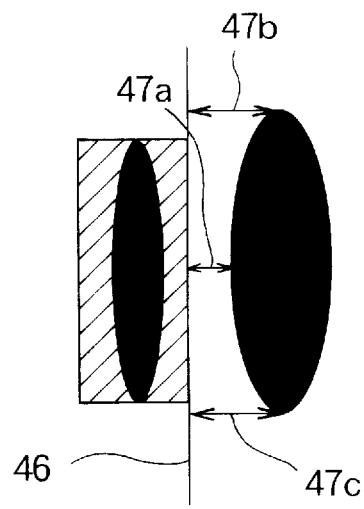
FIG. 25 illustrates a combination of eyebrow and eye image components to be processed by a relative position detector in accordance with a fifth embodiment of the invention.

A fifth embodiment of the invention is now described which is similar to the fourth embodiment except that, while the fourth embodiment uses the maximum-value position of eyebrow blocks 43 along the length of a human face as a reference position, the fifth embodiment determines the reference position using a minimum-value position of the same. In this case, as shown in FIG. 25, the eyebrow reference position setter 76 of FIG. 19 recognize the minimum-value position of one eyebrow image block 43 as a reference position 46. At this time, the maximum value 37a and the coordinate values of eye representative positions 37b, 37c of an eye image are also obtained in substantially the same manner as in the fourth embodiment, except that the coordinates of them are determined with the minimum-value position of the eyebrow block 43 being as a reference position. Based on the respective coordinate values, the distance measurement section 73 then measures respective distances 47a, 47b, 47c between the reference position 46 and the eye representative positions 37a, 37b, 37c (see FIG. 23) detected by the eye representative position detector 74.

The eye open/close detector 8 detects the open or closed state of eyes on the basis of the relationship among the distances 47a–47c thus obtained. As can be seen by incorporating by reference the teachings of FIGS. 24A and 24B, when eyes of a target person are open, the distance 47a exhibits an extreme difference from the remaining distances 47b, 47c in a corresponding block-converted image; when s/he closes eyes, there is substantially no extreme difference between the distance 45a and the others 47b, 47c. Accordingly, with this embodiment also, it is possible to effect detection of the open or closed states of eyes at higher precision even when the eyebrow images vary in shape with possible variations in face image pickup conditions.

Figure 26:
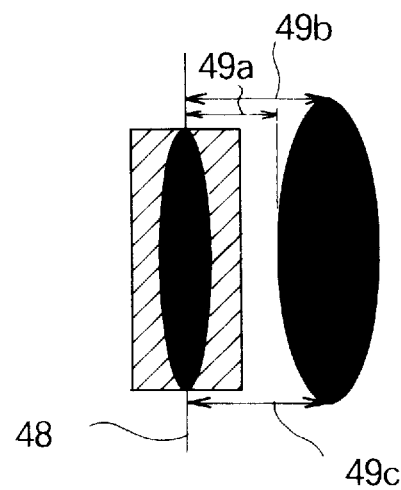
FIG. 26 shows a combination of eyebrow and eye image components to be processed by a relative position detector in accordance with a sixth embodiment of the invention.

The fifth embodiment may be modified such that the reference position is a midway point or center of eyebrow image blocks 43 along the face length, rather than the minimum-value position of the same as in the fifth embodiment. Such arrangement will be described below as a sixth embodiment of the invention. As shown in FIG. 26, the eyebrow reference position setter 76 (see FIG. 19) takes as a reference position 48 a midway point of one eyebrow image block 43 along the face length. At this time, the maximum value 37a and the coordinate values of eye representative positions 37b, 37c of an eye image are also obtained in substantially the same manner as in the fifth embodiment, except that the coordinates of them are determined with the center position of the eyebrow block 43 being as the reference position. The distance measurement section 73 then measures, based on the respective coordinate values, respective distances 49a, 49b, 49c between the reference position 46 and the eye representative positions 37a, 37b, 37c (see FIG. 23) detected by the eye representative position detector 74.

The eye open/close detector 8 detects the open or closed state of eyes on the basis of the relationship among the distances 49a–49c thus obtained. As can be seen by taking into account the teachings of FIGS. 24A and 24B, when target person's eyes are open, the distance 49a exhibits an extreme difference from the remaining distances 49b, 49c; on the other hand, when s/he closes eyes, there is substantially no extreme difference between the distance 49a and the others 49b, 49c. Accordingly, this embodiment can also effect precise detection of the open/closed state of eyes even when the eyebrow images vary in shape with possible variations in face image pickup conditions.

Figure 27:
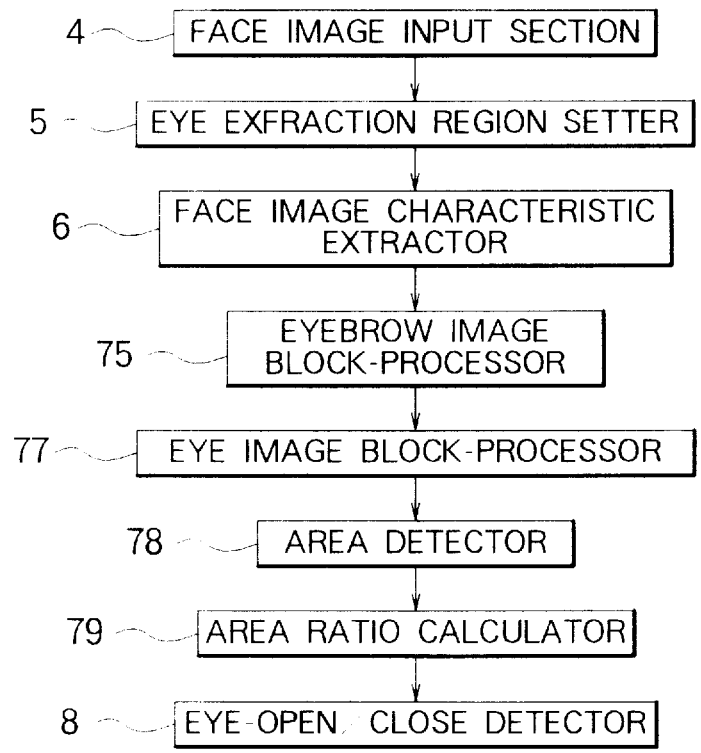
FIG. 27 is a schematic block diagram of a face image processing apparatus in accordance with a seventh embodiment of the invention.
Figure 28:
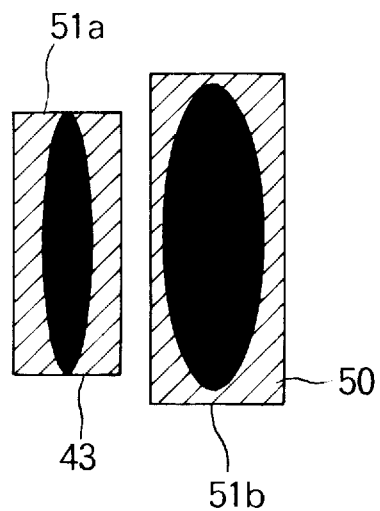
FIG. 28 shows a combination of eyebrow and eye image components to be processed by a relative position detector of the seventh embodiment.

A face image processor in accordance with a seventh embodiment of the invention is shown in FIG. 27. While the second to sixth embodiments detect the open/closed state of eyes by analyzing the relative positional relationship between one eyebrow image block and its corresponding eye image associated therewith, the seventh embodiment is specifically arranged so that the eye image is also block-processed together with the eyebrow block thus enabling the open/closed state of eyes to be detected by analyzing variations in the area ratio of them. The arrangement shown in FIG. 27 is similar to that of FIG. 2 with the relative position detector 7 being replaced by a series connection of an eyebrow-image block-processing section 75, an eye-image block-processing section 77, an area detecting section 78, and an area-ratio calculating section 79. The eyebrow-image block-processor 75 and eye-image block-processor 77 effect block-conversion processing for an eyebrow image and an eye image respectively in substantially the same manner as has been described above, thus providing an eyebrow image block 43 and a corresponding eye image block 50 associated therewith as shown in FIG. 28.

Then, the area detector 78 detects the exact area of each block based on the coordinate values of respective "blocked" image portions. The detected area ("51a" of FIG. 28) of the eyebrow block 43 remains substantially constant irrespective of the open or closed state of an eye, whereas the area ("51b" in FIG. 28) of the eye block 50 may change depending upon the open/closed state of the eye. The area-ratio calculator 79 then computes the area ratio of blocks 43, 51. The eye open/close detector 8 detects the open/closed state of the eye by analyzing variations in the area ratio.

This embodiment operates as follows. The eye-image block-processor 77 converts the eye image 16 (see FIG. 7) into a corresponding image block pattern in substantially the same manner as in the eyebrow-image block-processor 75, letting the resultant block be an eye block 50. The area detector 78 calculates the area of each of the eyebrow and eye blocks 43, 50 as shown by "51a" or "51b" in FIG. 28.

Figure 29A:
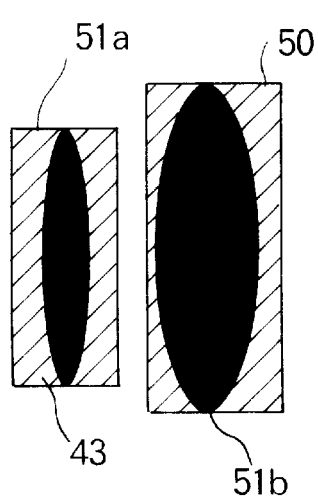
FIGS. 29A and 29B show respective combinations of eyebrow and eye image components to be processed by an eye open/close detector of the seventh embodiment.
Figure 29B:
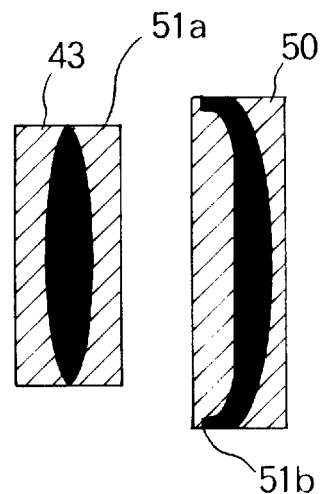

Then, the area ratio calculator 79 computes the ratio of the eye area 51b to the eyebrow area 51a. Based on variations in such area ratio, the eye open/close detector 8 then detects the open or closed state of a target eye. As shown in FIGS. 29A and 29B, the area ratio is smaller when the eye is closed than when open. Accordingly, with this embodiment, it is possible to effect precise detection of the open or closed state of eyes even when the eyebrow and eye images vary in shape with possible variations in face image pickup conditions.

Figure 30:
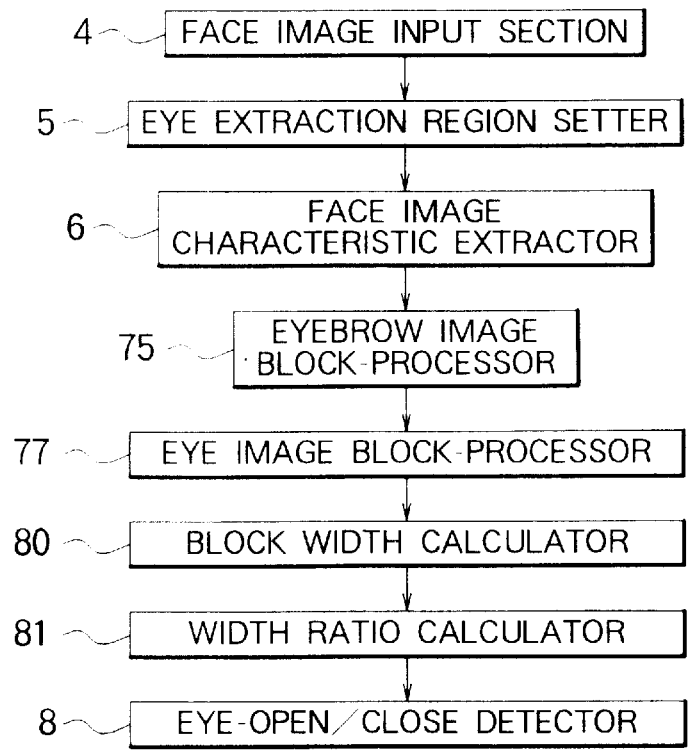
FIG. 30 is a block diagram of a relative position detector in accordance eighth an with embodiment of the invention.

A face image processor in accordance with an eighth embodiment of the invention is shown in FIG. 30. While the seventh embodiment detects the open/closed state of eyes by analyzing variations in the area ratio of the eyebrow and eye image blocks, the eighth embodiment is arranged so that such detection is effected based on variations in the ratio of the width of the eyebrow block along the face length and that of the eye block.

The eighth embodiment shown in FIG. 30 is similar to that of FIG. 27 with the area detector 78 and area-ratio calculator 79 being replaced with a block width measuring section 80 and a width-ratio calculating section 81. The section 80 is employed to measure the width of each of the eyebrow block 43 and eye block 50 along the face length. The section 81 is for calculating the ratio of the widths of eyebrow and eye blocks 43, 50.

Figure 31:
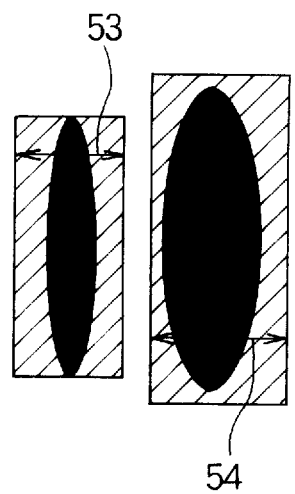
FIG. 31 shows a combination of eyebrow and eye image components to be processed by a relative position detector of the eighth embodiment.

This embodiment operates as follows. Upon receipt of the eyebrow block 43 and eye block 50 detected as shown in FIG. 31, the block width measurement section 80 measures the widths 53, 54 of respective blocks along the face length on the basis of the coordinate values thereof. The width-ratio calculator 81 then computes the ratio of the eye width 54 to the eyebrow width 53.

Figure 32A:
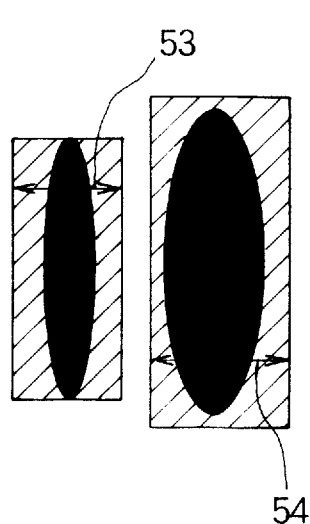
FIGS. 32A and 32B show respective combinations of eyebrow and eye image components to be processed by an eye open/close detector of the eighth embodiment.
Figure 32B:
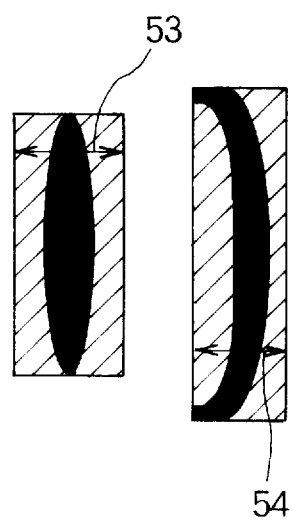
Figure 33:
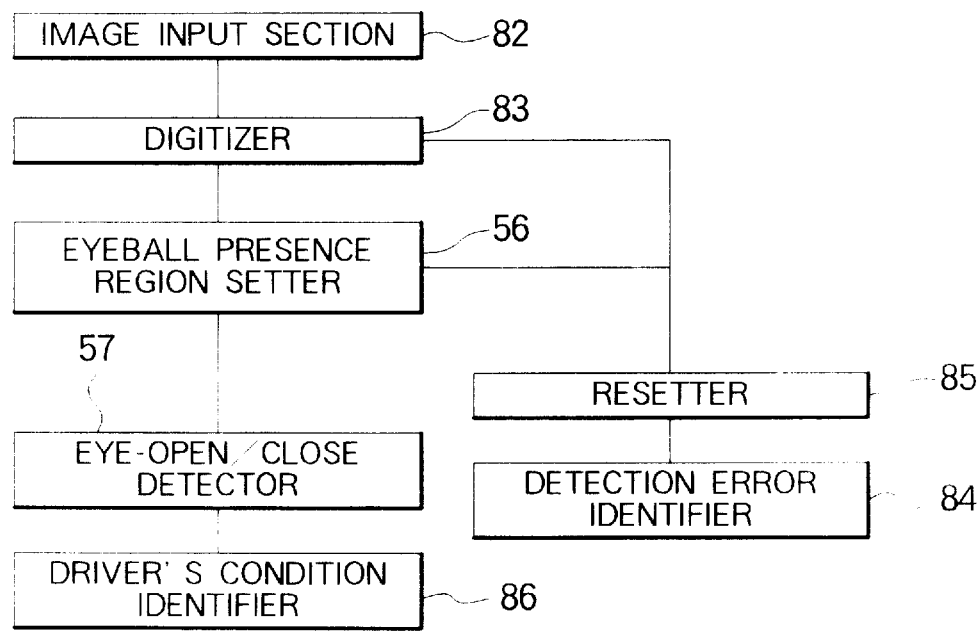
FIG. 33 is a block diagram of a prior art face image processing apparatus.
Figure 34:
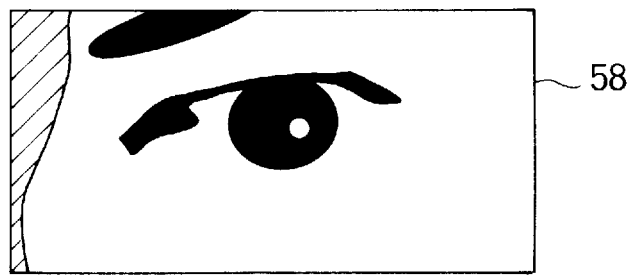
FIG. 34 shows a window corresponding to an eyeball presence region as extracted from an input face image of the prior art apparatus.
Figure 35:
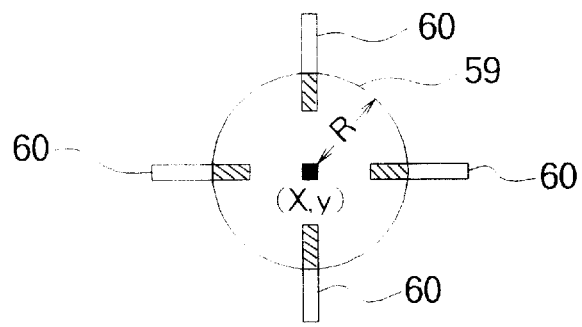
FIG. 35 shows a model used to explain the operation of an eye-open/close detector of the prior art.
Figure 36:
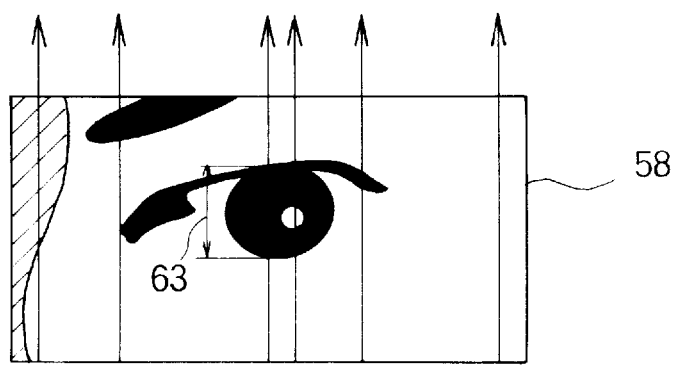
FIG. 36 shows an eyeball presence region window vertically scanned by the prior art eye-open/close detector.

The eye open/close detector 8 detects the open or closed state of eyes based on variations in the width ratio. It can be readily seen from FIGS. 32A and 32B that the width ratio is less when the eye is closed than when open. As a consequence, this embodiment can also effect precise detection of the open/closed state of eyes even when the eyebrow images vary in shape with possible variations in face image pickup conditions.

As has been described above, with the present invention, detecting the open/closed state of a target person's eyes can be successfully improved both in precision and in reliability due to the fact that such detection is based on detecting of the positional relation between at least one eyebrow image and a corresponding eye image associated therewith, wherein the eyebrow image may naturally be kept unchanged in state, and its position is easily detectable once after the associated eye image is detected.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A face image processing system operable to detect when a target person is in the process of falling asleep, said system comprising:

input means for acquiring an input image representing at least a portion of a face of said target person;

eye extraction region setter means for determining an eye extraction region within the input face image;

extractor means for extracting first and second image portions from the eye extraction region, said first and second image portions corresponding to an eyebrow image and an eye image respectively;

first detector means for detecting relative positions of said first and second image portions extracted; and second detector means for detecting when said target person is in the process of falling asleep by determining an open and closed state of the eye image through analysis of variations in the relative positions detected.

2. The system according to claim 1, wherein said first detector means detects variations in the relative positions of the eyebrow image and the eye image based on variations in distance therebetween.

3. The system according to claim 1, wherein said first detector means comprises:

reference position setter means for setting a reference position of the eyebrow image along a length of the face;

eye characteristic position detector means for detecting a midway point of the eye image along the length of the face and a position of at least one representation point of the eye image along the face length; and distance measurement means for measuring a distance between the reference position and the representation point.

4. The system according to claim 1, wherein said first detector means comprises:

centroid detector means for detecting respective centers of the eyebrow image and of the eye image along a width of the face; and distance measurement means for measuring a distance between the centers of the eyebrow image and the eye image thus detected.

5. The apparatus according to claim 1, wherein said eye extraction region setter means includes:

digitizer means for digitizing the input face image to provide a corresponding binary image, and for determining an eye extraction region with said binary image.

6. A face image processing system operable to detect when a monitored person is in the process of falling asleep, said system comprising:

face imaging input means for acquiring an input face image of at least a portion of the face of said monitored person;

eye extraction region setter means for setting an eye extraction region within an input face image;

face image characteristics extractor means for extracting from said eye extraction region first and second image portions corresponding to an eyebrow image and an eye image;

area detector means for detecting areas of the eyebrow image and of the eye image extracted;

area ratio calculator means for using said areas to calculate an area ratio between the eyebrow image and the eye image; and detector means for detecting when said person is in the process of falling asleep by determining a degree of an open or closed state of an eye based on variations in said area ratio calculated by said area ratio calculator means.

7. The apparatus according to claim 6, further comprising:

means for converting each of the eyebrow image and the eye image into corresponding block portions each having a frame of a fixed area and for providing eyebrow image blocks and eye image blocks; and said area detector means detecting the area of each of the eyebrow image blocks and the eye image blocks.

8. The apparatus according to claim 6, wherein said eye extraction region setter means includes:

digitizer means for digitizing the input face image to provide a corresponding binary image, and for determining an eye extraction region within said binary image.

9. A face image processing apparatus comprising:

face image input means for acquiring an input face image of a face being monitored;

eye extraction region setter means for setting an eye extraction region within the input face image;

face image characteristic extractor means for extracting an eyebrow image and an eye image from the eye extraction region;

measurement means for measuring a width of a certain portions of each of the eyebrow and eye images along a length of the face;

calculator means for calculating a width ratio between the width of the eyebrow image and that of the eye image; and detector means for detecting an open or closed state of an eye based on variations in the width ratio calculated by said calculator means.

10. The apparatus according to claim 9, further comprising:

means for converting each of the eyebrow image and the eye image into corresponding block portions each having a frame of a fixed area and for providing eyebrow image blocks and eye image blocks; and width measurement means for measuring a width of each of the eyebrow image blocks and the eye image blocks along a length of the face.

11. The apparatus according to claim 9, wherein said eye extraction region setter means includes:

digitizer means for digitizing the input face image to provide a corresponding binary image, and for determining an eye extraction region within said binary image.

12. A system for detecting fatigue in a monitored person, said system comprising;

input means for inputting an image representing at least a portion of said monitored person's face, said portion including at least one eye and at least one eyebrow;

a monitor for monitoring the relative positions of said eye and said eyebrow with respect to each other; and a controller for determining when said monitored person is fatigued based on the relative positions of the eye and eyebrow with respect to each other.

13. The system for detecting fatigue according to claim 12, wherein said controller determines when said monitored person is fatigued based on the distance between said eye and eyebrow.

* * * * *